United States Patent [19]

Seibert et al.

[11] Patent Number: 4,702,336
[45] Date of Patent: Oct. 27, 1987

[54] METHOD AND BRAKE SYSTEM FOR TRACTION CONTROL

[75] Inventors: Wolfram Seibert, Pfungstadt; Klaus-Dieter Blum, Kelkheim, both of Fed. Rep. of Germany

[73] Assignee: Alfred Teves GmbH, Frankfurt am Main, Fed. Rep. of Germany

[21] Appl. No.: 892,334

[22] Filed: Aug. 1, 1986

[30] Foreign Application Priority Data

Aug. 1, 1985 [DE] Fed. Rep. of Germany ....... 3527532

[51] Int. Cl.$^4$ .......................... B06T 26/16; B06T 8/60
[52] U.S. Cl. ................................. 180/197; 192/30 W; 303/103; 340/52 B
[58] Field of Search .................... 180/197; 192/30 W; 303/103, 100; 188/1.11; 340/52 B

[56] References Cited

U.S. PATENT DOCUMENTS

| 3,776,355 | 12/1973 | Scherenberg | 18/197 |
| 4,125,825 | 11/1978 | Takeuchi et al. | 340/52 B |
| 4,143,744 | 3/1979 | Oka | 192/30 W |

FOREIGN PATENT DOCUMENTS 2537066  6/1984  France ................................ 340/52 B Primary Examiner—John J. Love
Assistant Examiner—Karin L. Ferriter
Attorney, Agent, or Firm—James B. Raden

[57] ABSTRACT

For traction control, the wheel slip is determined by comparing the rotational velocity of the driven wheels with the rotational velocity of the non-driven wheels or with a reference quantity. In a wheel tending to spin up, the driving slip is reduced by a braking action. By logically combining the signals reflecting the rotational velocity of the wheel and taking into account the control process already initiated, the desired accelerator value or the deviation therefrom is determined and signaled to the vehicle operator. By observing the indicating instrument (26, 31), the vehicle operator is in a position to actuate the accelerator pedal in such a manner that a mere braking action will produce an optimum driving and starting slip and thus an optimum traction of the vehicle, without the risk of a brake overload condition occurring.

15 Claims, 2 Drawing Figures

METHOD AND BRAKE SYSTEM FOR TRACTION CONTROL

BACKGROUND OF THE INVENTION

This invention relates to a method for traction control for use in automotive vehicles wherein wheel rotation is continuously monitored. The wheel slip is determined by comparing the rotation of the driven wheels with the rotation of the non-driven wheels and/or a reference quantity. The driving slip is controlled by a braking action on the wheel tending to spin up. Brake systems for implementing this method are embraced by the present invention.

Methods and apparatus for traction control, that is, for preventing an undesired spin-up of the driven vehicle wheels as a result of an excessive driving torque or adverse road conditions, are known and have been provided in a variety of configurations. In many systems of this type, the vehicle wheels are equipped with sensors, for example, inductive pick-ups, furnishing an electrical signal whose frequency is dependent on the rotation of the wheel. An incipient spin-up condition is detectable by comparing the rotational velocity of a driven wheel with the rotational velocity of the non-driven wheel on the same side of the vehicle or with a reference quantity and by evaluating abrupt changes in the wheel rotation. In these cases, the metering out of brake pressure applied to the wheel brake of the wheel concerned will retard the wheel, whereby the traction or the positive wheel slip is limited to the desired value. In order to prevent the brake from being overloaded, the traction control further operates on the engine, reducing the engine torque by automatically reducing the supply of fuel, by changing the position of the throttle valve, etc. (German patent specifications DE-PS Nos. 3,127,302, 3,140,959). Also, it is known to have the traction control act upon the differential which is accomplished by engagement of the differential pawl when a tendency to spin is established (German patent specification DE-PS No. 3,342,574).

The complexity of wheel sensors, circuits for logically combining and evaluating the sensor signals as well as for the generation of control signals and in particular for the metered application of brake pressure from an auxiliary pressure source is considerable. Therefore, an obvious solution is to combine traction control apparatus of this type with electronically controlled anti-lock brake systems because these are equipped with the major part of the components required for traction control, particularly with wheel sensors, electronic circuits and brake pressure control valves. The additional provisions required for the metering out of brake pressure during the traction or driving slip control are limited to an extended logic and a few brake pressure control valves.

However, the intervention in the engine, that is, the throttling of the driving torque to a value optimum for the traction, causes difficulties and is a considerably more involved procedure. For the torque to be controlled independent of the position of the accelerator pedal, it is necessary to substitute a so-called electronic accelerator pedal for the accelerator pedal conventionally mechanically linked with the carburetor or injection apparatus. Also, the functional reliability of these components has to be very high because a delayed or insufficient reduction of the torque could overload and damage the brake. Further, an insufficient torque because of insufficient traction control is unacceptable, since conditions may occur in which a high traction or a high acceleration of the vehicle is absolutely mandatory to avoid dangerous situations.

It is, therefore, an object of this invention to provide a method for controlling the traction or the starting and driving slip which can be implemented with relatively little effort, but which operates reliably and permits an overload condition of the brake system to be avoided. By virtue of its relatively low manufacturing expenditure, the system is particularly suitable for vehicles in the medium and lower power ranges.

SUMMARY OF THE INVENTION

This object is accomplished with a method of the type initially referred to in a surprisingly simple manner by determining the accelerator desired value and/or the deviations therefrom by a logical combination of the signals reflecting the wheel rotation and derived measured quantities, taking into account the driving slip control already initiated, and by signaling these to the vehicle operator directly or indirectly.

In an advantageous embodiment of this invention, further measured values relating to vehicular dynamics such as translational acceleration, transversal acceleration or deceleration, instantaneous axle load distribution, instantaneous engine torque, driving or braking torques measured for each individual wheel or axle, curve detection signals, etc., are included in the logical operation and evaluated for the determination of the accelerator desired value or the deviation therefrom.

The present invention further provides for determination and indication of the accelerator desired value or the deviation therefrom in dependence upon the permissible loading capacity of the brake or upon the instantaneous or extrapolated brake load or brake temperature. Both the direction and the magnitude of the deviation from the accelerator desired value are advantageously indicated.

In further embodiments of the invention, the deviation from the desired value is visually indicated by a pointer instrument the excursion of which depends on the magnitude and direction of deviation. On the other and, it is also possible to use an indicating instrument comprising several signal lamps or luminous areas, wherein the magnitude of the deviation is indicated by different colors, brightness values, different indicator fields, and the like. For an audible indication of the desired value or its deviation, it is possible to vary the volume, the pitch and/or the sequence of the audible signals. Signaling by mechanical means is also possible, for example, by arranging for the accelerator pedal to vibrate.

A brake system for implementing the traction control of the invention is equipped with electronic circuits, that is, hard-wired logic circuits or programmed microcomputers, and indicating instruments, which determine the accelerator desired value and/or the deviations therefrom during a driving slip control phase, for observation by the vehicle operator through a display or indicating instrument.

In a still further embodiment, the brake system of the present invention possesses additional sensors by means of which measured quantities relating to vehicular dynamics, measured values dependent on the instantaneous driving torque, and the like, can be detected and included in the logical and signal processing operations for determination of the accelerator desired value or the deviation therefrom.

Accordingly, the present invention is based on the realization that the improvement described affords an ideal way of controlling, also in adverse situations, the brake traction, that is, the starting and driving slip, with a brake system actually limited to performing braking functions, without having to fear an overload condition of the brake. According to the present invention, this is accomplished by the insertion of a preferably visual or audible or mechanical indicating device notifying the vehicle operator of the accelerator desired value or the instantaneous deviation therefrom, thereby enabling him to respond in a manner producing the desired and optimum traction. The need for the traction control to operate automatically on the engine, which is a complicated and expensive procedure involving unavoidable drawbacks, is thereby obviated.

In a variant of the method of the invention and an apparatus for implementing this variant, the traction control operates without acting on the brake, indicating to the vehicle operator only the accelerator desired value and/or the deviations therefrom. While this reduces the number of components required for the traction control apparatus to a minimum, it does place higher demands on the operator. Indication and operator information can be improved still further by the inclusion of further measured values relating to vehicular dynamics or by the provision of suitable sensors whose signals are considered in the signal processing by means of hard-wired electronic circuits or microcomputers.

BRIEF DESCRIPTION OF THE DRAWING

Further objects, advantages and applications of the present invention will become apparent from the subsequent description of embodiments in conjunction with the accompanying drawing wherein.

DETAILED DESCRIPTION

Figure 1:
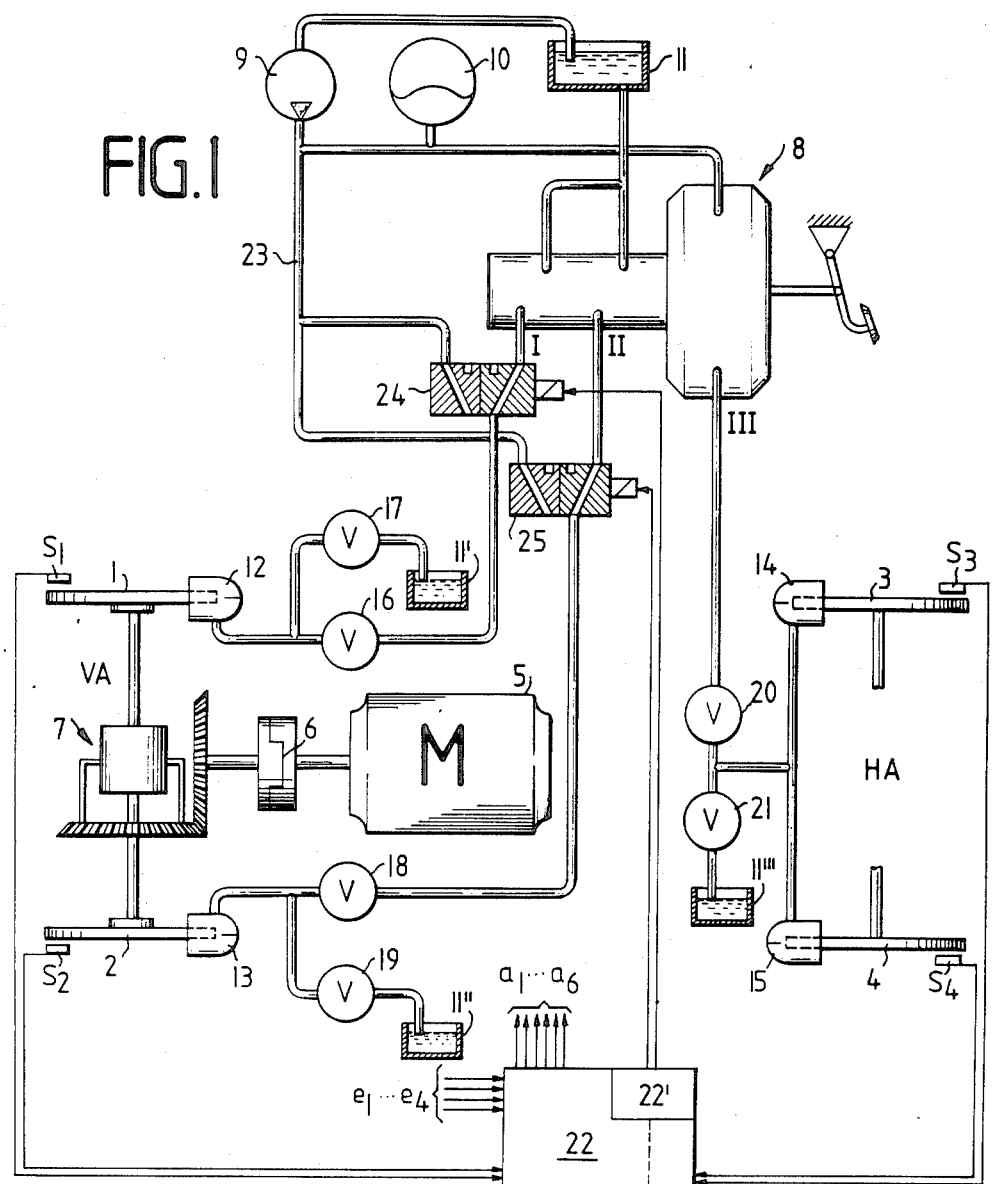
FIG. 1 is a schematically simplified representation of the major parts of a brake system of the invention, including the hydraulic and the electric interconnections.

Referring now to FIG. 1, there is shown a hydraulic brake system capable of controlling both the brake slip to avoid a locked wheel condition and the traction. The schematically shown example relates to a four-wheel vehicle having its front wheels 1, 2 driven by an engine 5, for example, a spark-ignition engine, by way of a clutch 6 and a differential 7. The rear wheels 3, 4 are not driven.

The brake system of the vehicle is made up of a three-circuit hydraulic brake pressure generating means 8 including an auxiliary pressure supply system which comprises a hydraulic pump 9 and a hydraulic accumulator 10. The suction side of the pump 9 is connected to a reservoir 11 which, in addition to providing pressure compensation, also serves as a fluid storage for the brake pressure generating means 8. The wheel brakes 12, 13 of the two front wheels 1, 2 are connected to the brake pressure generating means 8 by way of hydraulically separate brake circuits I, II, while the application of brake pressure to the wheel brakes 14, 15 of the rear wheels 3, 4 occurs in-phase by way of the third brake circuit III.

The fluid conduits leading to the individual wheel brakes 12, 13 and the fluid path leading to the two rear wheel brakes 14, 15 accommodate each a pair of inlet and outlet valves 16, 17; 18, 19; 20, 21, by means of which, during a controlled braking action, the brake pressure in the associated brake 12, 13, 14, 15 can be kept constant, reduced and increased again in a known manner. The outlet valves 17, 19, 21 are each connected to a pressure compensating reservoir 11', 11'', 11''' which is conveniently integrally formed with the compensating reservoir 11 of the auxiliary energy supply system 9, 10 and of the brake pressure generating means. The valves 16 to 21 are controlled by means of electric brake pressure control signals which are available at the outputs $a_1$ to $a_6$ of an electronic controller 22. For the sake of clarity, the connecting lines are not shown in the drawing. The brake pressure control signals are dependent upon the rotation of the individual wheels 1, 2, 3, 4 which is measured by means of sensors $S_1$ to $S_4$ having their outputs applied to the inputs of controller 22.

To control the starting and driving slip, a supply line 23 is provided through which hydraulic pressure can be directly fed from the auxiliary energy supply system 9, 10 to the wheel brakes 12, 13 of the driven front wheels 1, 2. For this purpose, electromagnetically switchable multiway directional control valves 24, 25 are inserted in the brake circuits I, II which are provided as three-way, two-position directional control valves and, in their positions of rest, connect the brake pressure generating means 8 with the wheel brakes 12, 13. After switchover, the path to the brake pressure generating means 8 is blocked and the auxiliary pressure supply line 23 is connected by way of inlet valves 16, 18 to the front wheel brakes 12, 13 instead. Valve pairs 16, 17; 18, 19 permit a metered and controlled application of the brake pressure also after switching of the three-way, two-position directional control valves 24, 25. The valves are also electrically connected to controller 22, more specifically to the symbolically separate section 22' of the controller which accommodates the traction control.

By means of the signals of wheel sensors $S_1$ to $S_4$—considering, where applicable, further sensor signals which are fed to controller 22 by way of inputs $e_1$ to $e_4$ and sense, for example, the instantaneous torque of the engine 5 or wheel-specific driving torques, a translational acceleration of the vehicle, etc. or which serve to detect a cornering condition. Hard-wired or program-controlled electronic circuits in the interior of controller 22, 22' determine the accelerator desired value or the deviations therefrom, signaling these to the vehicle operator by way of an indicating instrument 26.

In the relatively simple embodiment of the invention shown, the pointer 28 of indicating instrument 26 will travel to the right when the traction control process sets in. A vertical or approximately vertical position of pointer 28 is indicative of an optimum position of the accelerator pedal. As long as pointer 28 remains in the center area 27, the vehicle experiences an optimum traction which, depending on the road condition or the driving torque transferable to the road by the wheels can differ widely. As soon as during the traction control the braking action produces an excessive load and temperature of the brake which is computed by the circuits in controller 22, or as soon as the second wheel starts or tends to spin up, the pointer 28 will enter the warning range 29, thereby indicating to the vehicle operator that the driving torque is too high. A warning lamp 30 will light up if the controller is defective and also if the temperature of the brake or the brake fluid is excessive.

Figure 2:
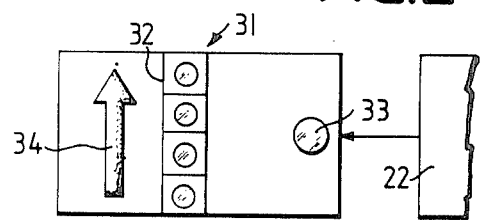
FIG. 2 is a second embodiment of an indicating instrument for the brake system of FIG. 1.

FIG. 2 illustrates a second embodiment in which an indicating instrument 31 has four signal lamps or luminous areas 32 differing in color and vertically arranged. With the traction at its optimum or at the onset of traction control, the topmost signal lamp will light up. With the brake load, the slip and the tendency to spin up increasing, a yellow lamp and then a still brighter, for example, an orange-colored signal lamp will light up in addition to or instead of the green signal lamp, thereby indicating that the brake load or the transferable driving torque have reached their limit or maximum values. A fourth signal lamp which may be red, for example, indicates that the deviation from the accelerator desired value has reached so high a value that immediate throttling of the engine is required. Finally, a warning lamp 33 serves to indicate that limit values have been exceeded, that the temperature monitor has responded, or that a defect has occurred.

An arrow 34 on the indicating instrument 31 reminds the operator that, after the accelerator desired value has been exceeded because of an excessive driving torque, an upward traveling of the indicator field signals a reapproach to the desired value or a reduction of the deviation therefrom.

It should be understood that numerous further configurations of the indicating instrument can be provided. In all cases, it is important that the vehicle operator be clearly notified of the direction and magnitude of the deviations from the accelerator desired value. In principle, this can be accomplished by traveling pointers or indicator fields, by controlling the brightness of one or several signal lamps, etc. Such visual indicator means may also be replaced by an audible signal of variable volume or frequency, or by a mechanical signal, for example, by a vibrating accelerator pedal.

In spite of the low manufacturing effort and in particular in spite of the fact than an intervention in the engine is dispensed with, the method of the present invention and the associated brake system permit an optimum traction control to be accomplished while the brake load remains low, or at least within permissible limits.

The present invention also makes use of the realization that the vehicle operator is in a position to concentrate on the observation of the indicating instrument in the majority of situations in which a traction control is required, for example, when starting or accelerating on slippery ground. Therefore, the vehicle operator can easily adjust the accelerator position in accordance with the indication if the required information on the desired position of the accelerator pedal is available as disclosed in the present invention. In this respect, an important difference exists relative to the brake slip control in emergency situations in which, for example, on panic braking, the vehicle operator is apt to react the wrong way, which is the reason why in such event a control without any operator intervention is preferable.

What is claimed is:

1. A method for traction control for use in automotive vehicles wherein wheel rotation is continuously monitored, with the wheel slip being determined by comparing the rotation of the driven wheels with the rotation of the non-driven wheels and/or a reference quantity such as the vehicle reference speed, and wherein the driving slip is controlled by a braking action on the wheel tending to spin up, said method comprising the steps of: determining the accelerator desired value and/or the deviation therefrom by a logical combination of the signals reflecting the wheel rotation and derived measured quantities; compensating for the driving slip control already initiated; and, signaling the accelerator values to the vehicle operator.

2. A method as claimed in claim 1, wherein further measured values related to vehicular dynamics including at least one of translational acceleration, transversal acceleration or deceleration, instantaneous axle load distribution, instantaneous engine torque, driving or braking torques measured for each individual wheel or axle, curve detection signals, are included in the logical operation and evaluated for the determination of the accelerator desired value or the deviation therefrom.

3. A method as claimed in claim 2, wherein the accelerator desired value and/or the deviation therefrom are determined and indicated as a function of at least one of the permissible loading capacity of the brake, the instantaneous or extrapolated brake load or the brake temperature.

4. A method as claimed in any one of claim 3, wherein the direction and the magnitude of the deviation from the accelerator desired value are indicated.

5. A method as claimed in any one of claim 4, wherein the deviation from the desired value is visually indicated by a pointer instrument (26) the excursion of which depends on the magnitude and direction of the deviation.

6. A method as claimed in any one of claim 4, wherein the accelerator desired value and/or the deviation therefrom are visually indicated by an indicating instrument (31) comprising several signal lamps or luminous areas, wherein the magnitude and direction of the deviation are signaled by at least one of different colors, brightness values, and indicator fields.

7. A method as claimed in any one of claim 1, wherein the accelerator desired value and/or the deviation therefrom are audibly indicated, with the volume, pitch and/or the sequence of the audible signals being determined by the direction and magnitude of the deviation.

8. A method as claimed in any one of claim 1, wherein the deviation from the desired value is signaled mechanically, for example, by providing for vibration of the accelerator pedal.

9. A method for traction control for use in automotive vehicles wherein wheel rotation is continuously monitored, with the wheel slip being determined by comparing the rotation of the driven wheels with the rotation of the non-driven wheels and/or a reference quantity such the vehicle reference speed, said method comprising the steps of: determining the accelerator desired value and/or the deviation therefrom by a logical combination of the signals reflecting the wheel rotation and derived measured quantities; and, signaling the determined accelerator values to the vehicle operator directly or indirectly.

10. A brake system with traction control with sensors to monitor wheel rotation, with electronic circuits for logically combining and processing the sensor signals and for generating brake pressure control signals by means of which brake pressure can be metered into the wheel brake of the wheel tending to spin up, wherein said system is equipped with circuits (22′) and indicating instruments (26, 31) which determine the accelerator desired value and/or the instantaneous deviation therefrom during a driving slip control phase and including means for signaling the determined accelerator values to the vehicle operator.

11. A brake system as claimed in claim 10, including additional sensors by means of which measured quantities relating to vehicular dynamics, measured values dependent on the instantaneous engine torque can be detected and included in the logical operations for determination of the accelerator desired value and the deviation therefrom.

12. A brake system as claimed in claim 11, wherein the indicator means (28, 29; 32) indicate the direction and magnitude of the instantaneous deviation from the accelerator desired value.

13. A brake system as claimed in claim 10, wherein said system is equipped with at least one microcomputer for logically combining the sensor signals ($S_1$ to $S_4$) and other measured values and for signal processing and determining the accelerator desired value and/or the deviation therefrom and for controlling the indicating instruments (26, 31).

14. An apparatus for traction control of an automotive vehicle comprising sensors for monitoring the wheel rotation and with electronic circuitries for logically combining and processing the sensor signals, and further comprising circuits (22') and indicating instruments (26, 31) which determine the accelerator desired value and the instantaneous deviation therefrom and signal these to the vehicle operator.

15. An apparatus as claimed in claim 14, including additional sensors by means of which measured quantities relating to vehicular dynamics, measured values dependent on the instantaneous engine torque, are detected and included in the logical operations for determination of the accelerator desired value and the deviation therefrom.

* * * * *